K. A. SIMMON.
CONTROL SYSTEM.
APPLICATION FILED OCT. 6, 1915.
1,284,798.
Patented Nov. 12, 1918.
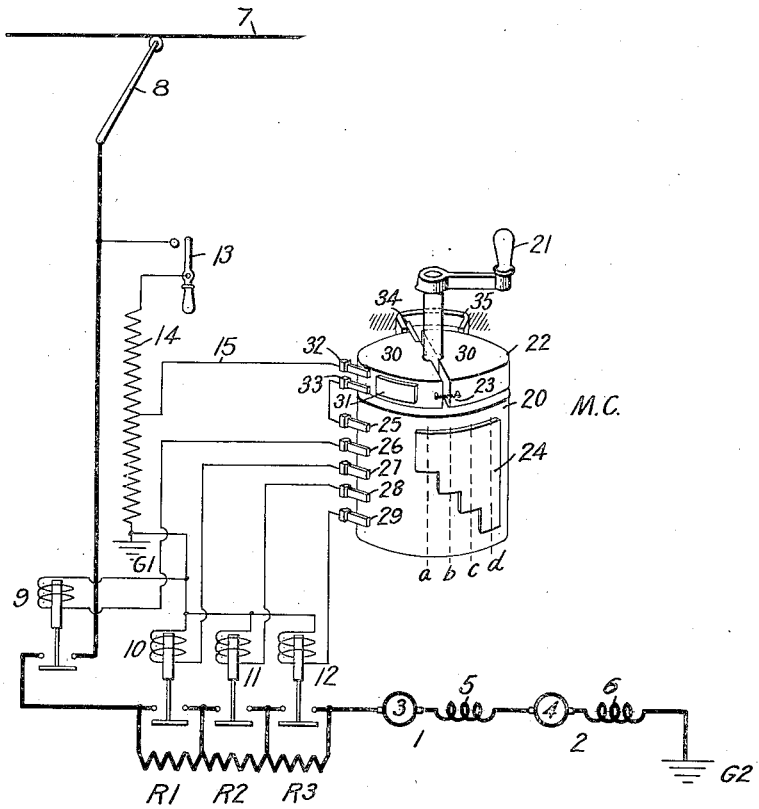
WITNESSES:
Fred H. Miller
W. B. Wells
INVENTOR
Karl A. Simmon
BY
Wesley G. Carr
ATTORNEY

UNITED STATES PATENT OFFICE.

KARL A. SIMMON, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,284,798.  Specification of Letters Patent.  Patented Nov. 12, 1918.

Application filed October 6, 1915. Serial No. 54,340.

*To all whom it may concern:*

Be it known that I, KARL A. SIMMON, a citizen of the United States and a resident of Edgewood Park, in the county of Allegheny and State of Pennsylvania, have invented a new and useful Improvement in Control Systems, of which the following is a specification.

My invention relates to control systems for electric motors and particularly to such systems as are adapted for the control of railway or vehicle motors and embody independent unit switches and master controllers.

One object of my invention is to provide a system of the above indicated class which shall embody simple and effective means for concurrently interrupting the energizing circuits of all energized switches when the controller is moved backward a predetermined amount.

Another object of my invention is to provide a system of the above indicated class embodying means to first deënergize the last unit switches operated in a reverse order to that in which they were operated and then to simultaneously deënergize all remaining switches when the controller is moved backwardly a predetermined amount.

A further object of my invention is to provide a system which includes a controller adapted to progressively energize unit switches for connecting the motor to the power circuit and for excluding resistance from the motor circuit when moved in a forward direction, and adapted first to deënergize the last few switches operated for including resistance in the motor circuit and then simultaneously to deënergize all operated switches when moved in a reverse direction.

Master controllers are usually arranged to complete the energizing circuits of the several unit switches in a predetermined sequence when moved in a forward direction in order to properly govern the motors during the period of acceleration and are also adapted to interrupt the energizing circuits in a reverse order when moved backwardly to their off position. Some controllers are constructed to complete an energizing circuit of the several unit switches in predetermined sequence when moved in a forward direction and are adapted to simultaneously interrupt all energizing circuits of the several unit switches when moved through a small angle in a reverse direction.

According to my invention, I provide a master controller with an auxiliary member or disk which has a frictional engagement with the main drum of the controller and is adapted, by means of suitable stops, to be restricted in its movement to a predetermined angle corresponding to a number of notches, whereby the main control circuit, which is interlocked with a contact member of the frictionally driven member, is completed in the first position of the master controller and remains so during the rest of the operation, so long as the controller is moved in a forward direction, but is interrupted when the controller is moved backwardly a predetermined number of notches.

In control systems adapted for high voltage, it is impractical to break connection between the motor and the power circuit when the full line voltage is being applied to the motor terminals, and, accordingly, the voltage of the current supplied to the motor must be reduced before the connection to the power circuit is broken. According to my invention, this is accomplished by using a slip-segment commutator, as disclosed in the application of N. W. Storer, Serial No. 774,394, filed June 18, 1913, now Patent No. 1,239,840, Sept. 11, 1917, which will first allow a number of resistors to be included in the motor circuit before the connection to the power circuit is broken.

The single figure of the accompanying drawing is a diagrammatic view of the circuit connections of a system of control embodying my invention.

Referring to the drawing, motors 1 and 2, embodying armatures 3 and 4 and field-magnet windings 5 and 6, are in series with resistors $R^1$, $R^2$ and $R^3$. The motors 1 and 2 are adapted to be connected to a power-circuit conductor 7 through a current collector 8 and a unit switch 9, and resistors $R^1$, $R^2$ and $R^3$ are adapted to be excluded from the motor circuit by means of unit switches 10, 11 and 12. The unit switches 9, 10, 11 and 12 are supplied with energy from the power-circuit conductor 7 through a hand-operated switch 13, a resistor 14 and a conductor 15, and are controlled by a master controller MC.

The master controller MC embodies a main drum 20 provided with an operating handle 21 and an auxiliary drum or disk 22 which is frictionally attached to the shaft of the main drum by means of springs 23 (one only of which is shown) or by other approved means. The main drum 20 is provided with a contact segment 24 of a peculiar configuration which is adapted to engage stationary contact terminals 25, 26, 27, 28 and 29. The auxiliary disk 22 embodies two similar half-segments 30 resiliently held together and in frictional contact with the shaft of the drum 20 by the springs 23, and a contact member 31 mounted on one of the segments 30 and adapted to engage stationary contact terminals 32 and 33.

In order to limit the movement of the frictionally-driven disk member 22, a projecting member 34 is provided which is adapted to engage one of the arms of a U-shaped stop 35, when moved in either direction, and thus restrict the movement to a sector which corresponds to one or a number of notches of the controller.

Assuming the apparatus and the connections to occupy the positions shown in the drawing, the driving motors may be started as follows:

The switch 13 is first closed to complete a circuit from the power conductor 7 through current collector 8 and the resistance 14 to a ground return conductor $G^1$; thus, the full line voltage is impressed upon the resistance 14, and a reduced voltage is impressed upon the contact terminal 32 of the master controller through the conductor 15.

If the main drum 20 of the master controller is moved by the handle 21 into position "$a$", the auxiliary disk 22 and its contact member 31 will be moved with the main conducting segment 24, by reason of frictional engagement between the members 20 and 22, until the movement is stopped by the engagement of the stop 35 with the projecting member 34. In this position of the master controller, segment 31 bridges the contact terminals 32 and 33 and the controller segment 24 bridges the contact terminals 25 and 26. Thus, a circuit is established from the power conductor 7, through the current collector 8, switch 13, resistance 14, conductor 15, contact terminals 32, 33, 25 and 26, segments 31 and 24 and unit switch 9 to the ground return conductor $G^1$. The unit switch 9 is energized, and a circuit is established from the power conductor 7, through current collector 8, switch 9, resistors $R^1$, $R^2$ and $R^3$ and the motors 1 and 2 to the ground return conductor $G^2$. The master controller is then moved to positions $b$, $c$ and $d$, thus operating unit switches 10, 11 and 12 and successively short circuiting the resistors $R^1$, $R^2$ and $R^3$ to accelerate the motors 1 and 2 to full speed.

It will be noted that, after the auxiliary disk 22 has been moved to the position $a$, no further movement thereof is possible in a forward direction, and the conducting segment 24 is moved into its other positions independently thereof. Obviously, the contact member 31 bridges the contact terminals 32 and 33 and thus supplies energy to the main contact terminal 25 so long as the controller MC is moved in a forward direction.

If the master controller is moved from any of its operating positions in a reverse direction, the frictional engagement between the main drum 20, carrying the conducting segment 24, and the auxiliary disk 22, carrying the conducting segment 31, causes the disk to be moved with the main drum until the stop 35 engages the projecting member 34. The length of the conducting segment 31 is made sufficient to maintain the contact terminals 32 and 33 bridged until the controller has been reversely moved one or a number of notches. Thus, before the segment 31 becomes disengaged from the contact terminals 32 and 33 and the motor circuit is broken, one or a number of the unit switches 10, 11 and 12 will be deënergized, and one or a number of the resistors $R^1$, $R^2$ and $R^3$ will be inserted in the motor circuit. Accordingly, if the line voltage is too high to be broken conveniently by the unit switches 9, 10, 11 and 12, when deënergized simultaneously, it is insured that, if the controller had been moved to position $d$ so that full line voltage is supplied to the motors, resistance will be inserted in the motor circuit before this circuit is broken by simultaneously deënergizing all of the unit switches.

Although I have described my invention and illustrated it in connection with the apparatus of a control system of very simple nature, it is understood that my invention is not to be, in any sense, restricted to the particular construction and connections set forth and that various modifications therein may be effected without departing from the spirit and scope of my invention as set forth in the appended claims.

I claim as my invention:

1. In a control system, the combination with a motor and a plurality of electrically operated switches for governing the operation thereof, of a controller embodying means for first deënergizing a number of said switches and then simultaneously deënergizing the remaining switches when the controller is reversed a short distance.

2. In a control system, the combination with a motor, a power circuit, a plurality of electrically operated switches for connecting the motor to the power circuit and for regulating the voltage of the current supplied to the motor, of a controller embodying means, when moved backwardly a short distance, for first deënergizing certain of said switches to reduce the voltage applied to said motor and then simultaneously deënergizing the remaining switches and disconnecting the motor from the power circuit.

3. In a control system, the combination with an electric motor and a plurality of electrically operated switches for controlling the operation of the motor, of a controller embodying means for operating the switches in a predetermined order when moved in a forward direction, and means for first deënergizing the last few switches operated and then deënergizing all remaining switches simultaneously when the controller is moved backwardly a small distance.

4. In a control system, the combination with an electric motor, a plurality of electrically operated switches, and means operated by said switches for controlling the current supplied to said motor, of a controller for operating said switches in a predetermined order when moved in a forward direction and embodying means, when moved backwardly, for first deënergizing the last few switches operated and then simultaneously deënergizing all remaining switches.

5. In a control system, the combination with an electric motor and a plurality of electrically operated switches for controlling the operation of said motor, of a master controller for controlling the operation of said switches and comprising a main drum for operating said switches in a predetermined order when the controller is moved in a forward direction and for deënergizing in a reverse order the last few switches operated when moved backwardly a small distance, and means comprising an auxiliary member frictionally connected to the main drum for deënergizing all remaining switches after the controller has been moved backwardly a small distance.

6. In a control system, the combination with an electric motor and a plurality of switches for operating the motor, of a controller comprising a main drum for operating the switches in a predetermined order when moved in a forward direction and for deënergizing in a reverse order the last few switches operated when moved a short distance backwardly and an auxiliary member frictionally connected to the main drum, and means for limiting the movement of said auxiliary member, whereby, when the controller is moved backwardly a short distance, all switches not deënergized by the main drum are deënergized.

7. In a control system, the combination with an electric motor, a plurality of resistors in series with the motor, a power circuit, and a plurality of electrically operated switches for connecting the motor to the power circuit and for excluding the resistors from the motor circuit, of a controller for controlling the operation of said switches and embodying means, when moved backwardly a small distance, for first deënergizing certain of said switches, thus including resistance in the motor circuit and then simultaneously deënergizing all the remaining switches.

8. The method of controlling an electric motor which consists in connecting the motor to a power circuit, establishing short circuits around resistors in the motor circuit in a predetermined order, breaking the short circuits around a portion of the resistors, and simultaneously breaking the connection of the motor to the power circuit and opening all remaining short circuits around the resistors.

9. The method of controlling an electric motor which consists in energizing a plurality of electrically-operated switches in a predetermined order, thereby connecting the motor to a power circuit and establishing short circuits around resistors in the motor circuit, deënergizing a portion of the switches for opening a portion of the short circuits, and simultaneously deënergizing all remaining switches.

10. In a control system, a supply circuit and a motor adapted to be connected to the supply circuit, of a plurality of accelerating resistors, means comprising a plurality of switches for excluding said resistors from the motor circuit, a controller for governing the operation of the switches, and means comprising an auxiliary contact segment for operating said switches to prevent the breaking of the motor circuit unless a portion of said resistors is included in the motor circuit.

11. In a system of control, a supply circuit, a motor adapted to be connected to the supply circuit, and a controller for governing the operation of the motor, of a plurality of accelerating resistors, means for excluding said resistors from the motor circuit, and means comprising an auxiliary contact segment mounted on the controller for preventing the breaking of the motor circuit by said controller unless a portion of said resistors is included in the motor circuit.

In testimony whereof, I have hereunto subscribed my name this 28th day of Sept., 1915.

KARL A. SIMMON.